(12) United States Patent
Takeuchi et al.

(10) Patent No.: US 6,321,260 B1
(45) Date of Patent: Nov. 20, 2001

(54) MEDIA DATA COMMUNICATION METHOD VIA NETWORK

(75) Inventors: Tadashi Takeuchi; Takahiro Nakano, both of Yokohama; Masaaki Iwasaki, Tachikawa; Teruo Tanaka, Hadano, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/146,535

(22) Filed: Sep. 3, 1998

(30) Foreign Application Priority Data

Sep. 12, 1997 (JP) ................................. 9-248175

(51) Int. Cl.$^7$ ................................. G06F 13/00
(52) U.S. Cl. ................................. 709/223
(58) Field of Search ................ 455/454; 370/355, 370/360, 401, 236, 230; 709/223, 206; 711/122; 704/223

(56) References Cited

U.S. PATENT DOCUMENTS

| | | | |
|---|---|---|---|
| 5,065,393 | * 11/1991 | Sibbitt et al. | 370/360 |
| 5,625,877 | * 4/1997 | Dunn et al. | 455/454 |
| 5,732,078 | * 3/1998 | Arango | 370/355 |
| 5,737,534 | * 4/1998 | Suzuki | 709/223 |
| 5,781,532 | * 7/1998 | Watt | 370/236 |
| 5,920,566 | * 7/1999 | Hendel et al. | 370/401 |
| 5,953,316 | * 9/1999 | Lazar et al. | 370/230 |
| 6,073,211 | * 6/2000 | Cheng et al. | 711/122 |

OTHER PUBLICATIONS

Computer Networks Third Edition, Andrew S. Tanenbaum, Prentice Hall, pp. 276–287, 1996.
Internet Stream Protocol, CIP Working Group, pp. 1–74, Jul. 7, 1997.
Internet Protocol: Connectionless Datagram Delivery, pp. 89–107 Internet Protocol: Routing IP Datagrams, pp. 109–121.
User Datagram Protocol pp. 159–169 A Micro–kernel for Isochronous Video–Data Transfer pp. 334–349.
Resource Reservation Protocl (RSVP) pp.1–57, May 27, 1998.
Link–sharing and Resource Management Models for Packet Networks, by Sally Floyd, et al vol. 3. No.4, Aug. 1995 pp.1–23.

* cited by examiner

*Primary Examiner*—David Wiley
(74) *Attorney, Agent, or Firm*—Antonelli, Terry, Stout & Kraus, LLP

(57) ABSTRACT

Before starting data transfer, the sender node sends the CONNECT message requesting security of hardware resources necessary for data transfer to the receiver node. Each node relaying the CONNECT message secures the CPU time and bandwidth necessary for data transfer and sends the CONNECT message to the receiver node. Upon receipt of the CONNECT message, the receiver node reserves the CPU time necessary for data reception and then sends the ACCEPT command to the sender node. The sender node receives the ACCEPT command and then sends a data packet.

5 Claims, 18 Drawing Sheets

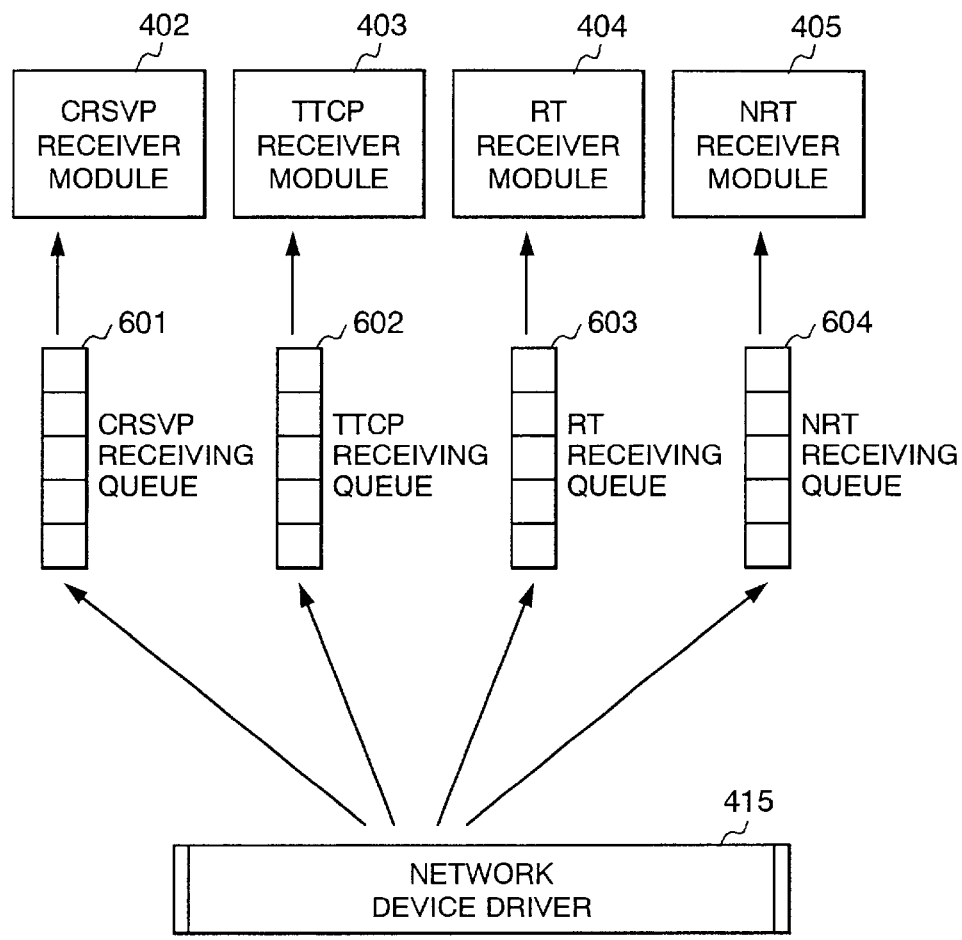

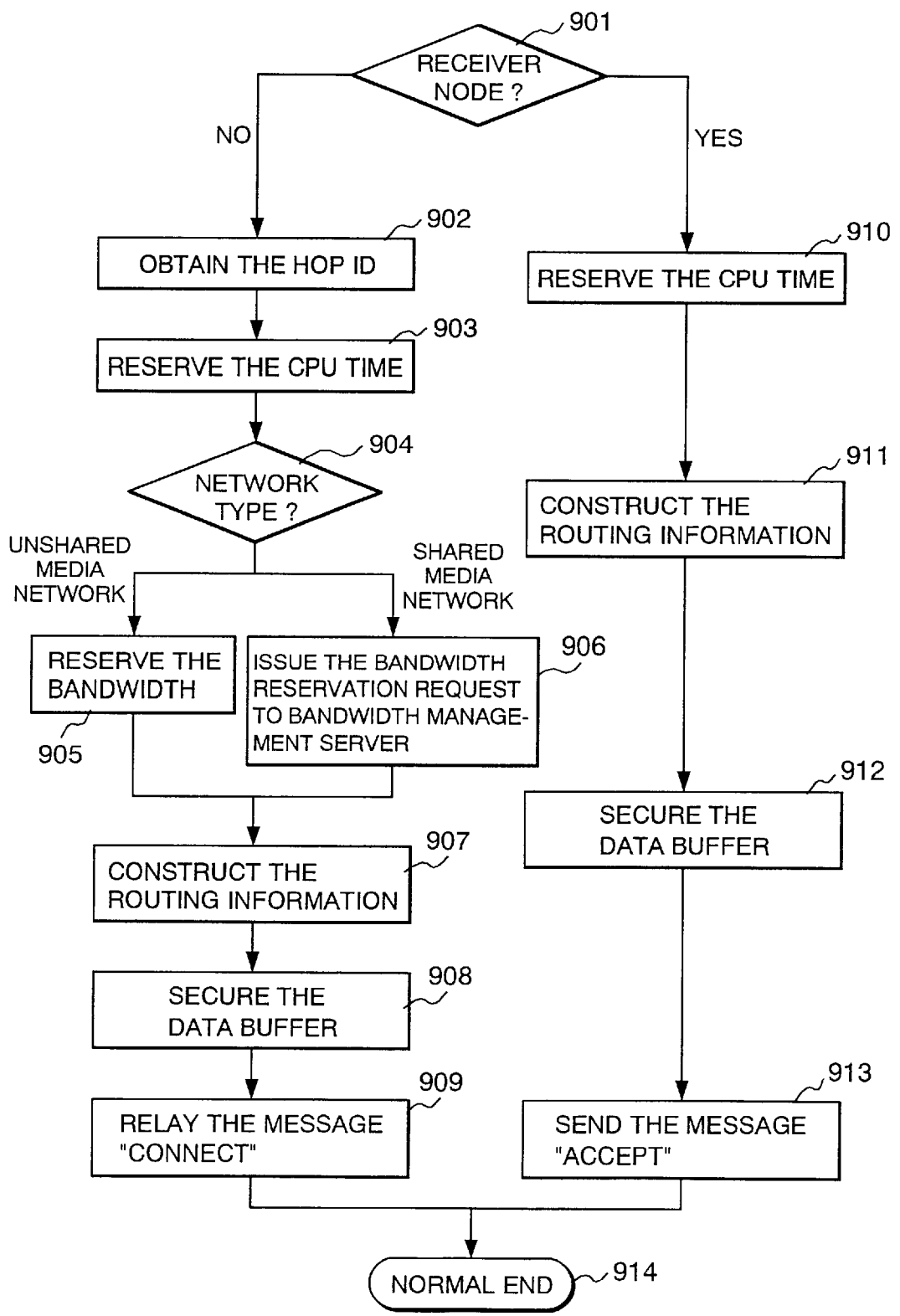

FIG. 10

CPU TIME ALLOCATION TABLE — 1001

*ISOCHRONOUS TRANSFER MODULE* — 1002

| HOP ID | UTILIZATION |
|---|---|
| 18 | 5.0% |
| 24 | 2.5% |
| ... | |
| TOTAL | 10.0% |

*RT RECEIVER MODULE* — 1003

| HOP ID | UTILIZATION |
|---|---|
| 11 | 5.0% |
| 29 | 22.5% |
| ... | |
| TOTAL | 35.0% |

(columns: 1004 HOP ID, 1005 UTILIZATION)

ALLOWABLE CPU TIME UPPER LIMIT TABLE — 1006

| MODULE NAME | UTILIZATION UPPER LIMIT | |
|---|---|---|
| ISOCHRONOUS TRANSFER MODULE | 15.0% | 1007 |
| RT RECEIVER MODULE | 40.0% | 1008 |

NECESSARY CPU TIME / UNIT TRANSACTION TABLE — 1009

< RECEIVE > — 1010

| | | |
|---|---|---|
| DEPENDED TO PACKET LENGTH | 0.5% | 1012 |
| INDEPENDENT FROM PACKET LENGTH | 2.0% | 1013 |

< SEND > — 1011

| | |
|---|---|
| DEPENDED TO PACKET LENGTH | 0.1% |
| INDEPENDENT FROM PACKET LENGTH | 0.4% |

FIG. 12

BANDWIDTH ALLOCATION TABLE 1201

< RT > 1202

Bandwidth Allocation 1203, 1204

| HOP ID | USED BANDWIDTH |
| --- | --- |
| 12 | 3.0 Mbps |
| 36 | 12.0 Mbps |
| . . . | |
| TOTAL | 30.0 Mbps |

< NRT > 1205

1206

| USED BANDWIDTH |
| --- |
| 20.0 Mbps |

ALLOWABLE BANDWIDTH
UPPER LIMIT TABLE 1208, 1209, 1207

| INTERFACE NAME | BANDWIDTH UPPER LIMIT |
| --- | --- |
| eth0 | 80 Mbps |
| eth1 | 80 Mbps |
| atm0 | 155 Mbps |

FIG. 14

1401 ROUTING INFORMATION TABLE

| RECEIVED HOP ID | INTERFACE NAME | SENT HOP ID | LAN ADDRESS |
|---|---|---|---|
| | | | |
| | | | |
| | | | |
| | | | |

1406 HOP ID REGISTRATION TABLE

| HOP ID | SENDER NODE IP ADDRESS | SENDER NODE PORT NO. |
|---|---|---|
| | | |
| | | |
| | | |
| | | |
| | | |

MEDIA DATA COMMUNICATION METHOD VIA NETWORK

FIELD OF THE INVENTION

The present invention relates to a data communication method, and more particularly to a data communication method for satisfying a transfer rate requested by an information processor of a sender and transferring continuous media data such as voice data and moving picture data between two information processors connected via a plurality of information processors.

BACKGROUND OF THE INVENTION

As a communication method for transferring continuous media data such as voice data and moving picture data by satisfying the transfer rate requested by the information processor (hereinafter referred to as the sender node) sending the data, ST-II (RFC-1190) is known.

The procedure when continuous media data is to be transferred to an information processor (hereinafter referred to as a receiver node) performing one reception from one sender node in ST-II will be explained hereunder. It is assumed that continuous media data is relayed by an information processor (hereinafter referred to a router node) relaying a plurality of data while the continuous media data reaches the receiver node from the sender node.

Before starting transfer of continuous media data, the sender node sends the message CONNECT to the receiver node. While the message CONNECT reaches the receiver node from the sender node, it passes through a plurality of router nodes. In this case, the router nodes through which the message CONNECT passes are uniquely decided by the routing function of ST-II.

The message CONNECT contains the following information.

A) Hop ID
B) QoS parameter (QoS is an abbreviation for Quality of Service and means "quality of continuous media data".)
C) Receiver node ID information The hop ID is used to identify a logical connection between the sender node and the receiver node which is generated by the message CONNECT. This hop ID is decided by negotiation between a sender and a router node or a receiver node (hereinafter referred to as a next hop, a node previously receiving the message CONNECT is hereinafter called a previous hop) receiving the message CONNECT next. It is necessary to specify this ID so that it will be unique on the next hop. There is the possibility that the hop ID corresponding to the same logical connection may vary with the node. The QoS parameter specifies the required quality (for example, required network bandwidth, etc.) of continuous media data to be transferred on the aforementioned logical connection. In the receiver node ID information, sufficient information to uniquely decide the receiver node on the network is stored.

The router node receiving the message CONNECT performs the following.
1) Obtaining of Hop ID A hop ID which is not used in the next hop is secured by negotiation with the next hop. The next hop uniquely decides the routing function of ST-II from the receiver node ID information included in the message CONNECT.
2) Generation of Routing Information to be Used for Continuous Media Data Transfer From the hop ID included in the received continuous media data, routing information sufficiently enough to search for the hop ID and LAN address to be included in the continuous media data to be transferred to the next hop is generated.

3) Reservation of Resource Necessary for Continuous Media Data Transfer

The data buffer on the router node and the network bandwidth between the router node and the next hop are secured. ST-II does not specify a method for sending and receiving a control message to and from another node so as to secure the network bandwidth. Therefore, in a network occupying and using a logical transmission path (hereinafter a logical transmission path is abbreviated to a transmission path) such as an ATM network only by the self node, it can be guaranteed that the secured bandwidth can be used also during transfer of continuous media data. However, in a network sharing a transmission path such as Ethernet with another node, the aforementioned guarantee is impossible (the reason will be described immediately later).
4) Relay of the Message CONNECT to the Next Hop The message CONNECT is relayed to the next hop uniquely decided by the routing function of ST-II.

The receiver node receiving the message CONNECT sends the message ACCEPT to the sender node when it accepts the logical connection establishment request from the sender node and the message REFUSE to the sender node when it rejects the logical connection establishment request.

The sender node receiving the message ACCEPT from the receiver node starts transfer of continuous media data. In the continuous media data sent from the sender node, the hop ID obtained by negotiation between the sender node and the next hop is included.

The continuous media data passes through a plurality of router nodes before it reaches the receiver node. The router nodes route the continuous media data using the routing information obtained in 2) mentioned above. Namely, the routing system for the control message such as the message CONNECT or ACCEPT is different from the routing system for continuous media data.

The data buffer and network bandwidth necessary for the continuous media data relay process are secured in 3) mentioned above. Therefore, it is impossible that the relay of continuous media data is delayed due to deficiency of the data buffer or deficiency of the bandwidth (in a network which can share the transmission path with the next hop) and the data transfer rate requested by the sender node is not satisfied.

Next, the procedure when the sender node transfers continuous media data to the receiver node in the CSMA/CD system ('COMPUTER NETWORKS THIRD EDITION' ANDREW S. TANENBAUM, PRENTICE HALL, pp 276–287, 1996) will be explained. In this case, it is assumed that the sender node and receiver node exist on the same LAN. Therefore, the sender node and receiver node communicate with each other without using router nodes.

In an LAN of the CSMA/CD system (that is, a network sharing the transmission path by a plurality of nodes), a transfer delay of continuous media data may occur due to another data transfer. Namely, even if the sender node attempts to transfer continuous media data at the transfer rate requested by the self node, the network is in use for another data transfer at transfer start time, so that the transfer of continuous media data may be delayed. As a result, the data transfer rate requested by the sender node will not be satisfied. To prevent it, it is necessary to control the total of bandwidths used on the LAN up to a fixed upper limit any time. When the total of bandwidths in use is a fixed upper limit or less, the probability of delay occurrence caused by that the network is in use reduces and the data transfer rate requested by the sender node can be satisfied.

As mentioned above, even if ST-II transfers continuous media data from the sender node to the receiver node via a plurality of router nodes, there is no possibility that the transfer rate requested by the sender node may not be satisfied due to deficiency of the data buffer on the router. When the network between the sender node and the receiver node comprises only networks which can occupy a transmission path such as ATM, there is no possibility that the transfer rate requested by the sender node may not be satisfied due to deficiency of the bandwidth of the network.

However, networks have recently speeded up and there is the possibility that the relay process for continuous media data to be performed by the router nodes or the receiving process for continuous media data to be performed by the receiver node may be delayed due to deficiency of the processing capacity of the router nodes or the receiver node. For example, it is assumed that continuous media data of 80 Mbps is to be relayed from the sender node to the receiver node. The intervening network comprises a 100-Mbps Fast Ethernet network and a 155-Mbps ATM network and the establishment of a logical connection by the message CONNECT in ST-II succeeds. However, when the intervening router node has only a relay capacity of 40-Mbps continuous media data, a delay of the relay process occurs in the router node and the transfer rate requested by the sender node cannot be satisfied. Even when the receiver node also has only a receiving capacity of 40-Mbps continuous media data, the transfer rate requested by the sender node cannot be satisfied.

Even if there is a network sharing a transmission path such as Ethernet with another node between the sender node and the receiver node, there is the possibility in ST-II that the transfer rate requested by the sender node may not be satisfied. For example, in the aforementioned example, although the establishment of a logical connection in ST-II succeeds, when the sender node and router node attempt to start to send continuous media data to Fast Ethernet, Fast Ethernet is being used by another node belonging to the same LAN and a sending delay may occur. As a result, it becomes difficult to satisfy the transfer rate of the sender node.

SUMMARY OF THE INVENTION

Therefore, an object of the invention is to provide a data communication method for satisfying the transfer rate requested by the sender node and transferring continuous media data from the sender node to the receiver node even if (1) a high-speed network in which a transfer delay may occur due to deficiency of the relay processing capacity of the router nodes and deficiency of the receiving capacity of the receiver node, (2) a network sharing the transmission path by a plurality of nodes, and (3) all the router nodes exist between the sender node and the receiver node.

(1) To solve the aforementioned problem, the present invention provides the communication method described below when there is a high-speed network between the sender node and the receiver node in which a transfer delay may occur due to deficiency of the relay processing capacity of the router nodes and deficiency of the receiving capacity of the receiver node.

Firstly, before an information processor for sending data starts the data transfer, it sends a control message storing the information processor for sending data, an information processor for receiving data, the data packet size, and the data packet transfer rate to the information processor for receiving data. In the relay process for the control message by an information relay device, the information relay device reserves a sufficient CPU time to perform the relay process of data having the packet size and transfer rate stored in the control message. Upon receipt of this control message, the information processor for receiving data reserves a sufficient CPU time to perform the receiving process for data having the packet size and transfer rate stored in the control message. Thereafter, the information processor for receiving data sends back a control message for notifying reception of the control message to the information processor for sending data.

(2) To solve the aforementioned problem, the present invention also provides the communication method described below when there is a network sharing a transmission path by a plurality of nodes between the sender node and the receiver node.

Firstly, before an information processor for sending data starts the data transfer, it sends a control message storing the information processor for sending data, an information processor for receiving data, the data packet size, and the data packet transfer rate to the information processor for receiving data. In the relay process for the control message by an information relay device in the network, the information relay device sends a control message requesting reservation of the bandwidth necessary for data relay to the information processor managing the total traffic of the network and reserves a sufficient CPU time to perform the relay process for data having the packet size and transfer rate stored in the control message.

(3) To solve the aforementioned problem, the present invention further provides the communication method described below when there are all the router nodes between the sender node and the receiver node.

Furthermore, in the aforementioned information processors, the present invention has an external interface which can declare the CPU time for each unit size required by a process depending on the packet size among the processes of sending and receiving data and the CPU time required by a process independent on the packet size respectively and the information relay device calls the external interface. Immediately before performing the relay process for the control message, the information relay device calculates the CPU time necessary for data relay from the packet size and transfer rate stored in the control message and the CPU time declared when the external interface is called and reserves the calculated CPU time.

BRIEF DESCRIPTION OF THE DRAWINGS

FIG. 6 is a structural diagram of data used at packet receiving time.

FIG. 7 is a format of a CRSVP packet.

FIG. 9 is a detailed flow chart of Step 803.

FIG. 10 is a structural diagram of data used at CPU time reservation time.

FIG. 12 is a structural diagram of data used at bandwidth reservation time.

FIG. 14 is a structural diagram of data used at routing information construction time.

DESCRIPTION OF PREFERRED EMBODIMENT

An embodiment of the present invention will be explained hereunder in detail.

Figure 1:
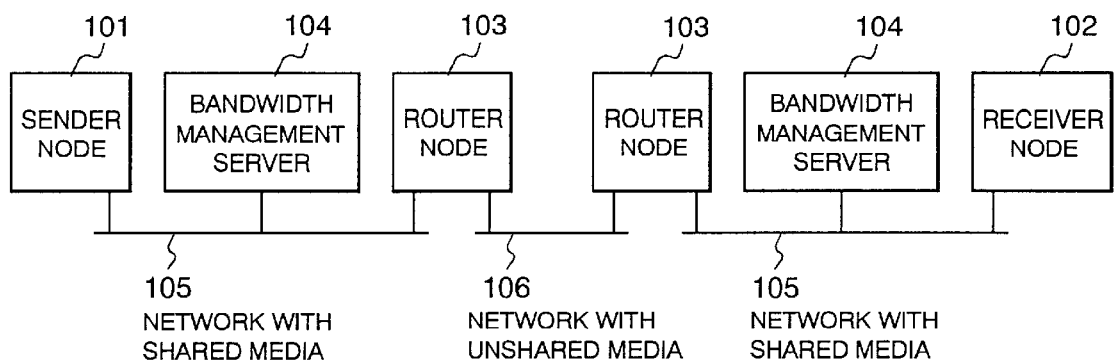
FIG. 1 is a block diagram of nodes and networks used in an embodiment of the present invention.

The node constitution and the network constitution connecting nodes used in this embodiment are shown in FIG. 1.

In this embodiment, it is assumed that a sender node (101) and a receiver node (102) which mutually send and receive continuous media data are connected to networks via a plurality of router nodes (103). The router nodes relay control data and continuous media data sent to the receiver node from the sender node. It is assumed that as networks existing between the sender node and the receiver node, a network with shared media (105) such as Ethernet and a network with unshared media (106) such as ATM coexist. It is assumed that in the network with shared media, one bandwidth management server (104) for managing the total of bandwidths used in the network exists.

Figure 2:
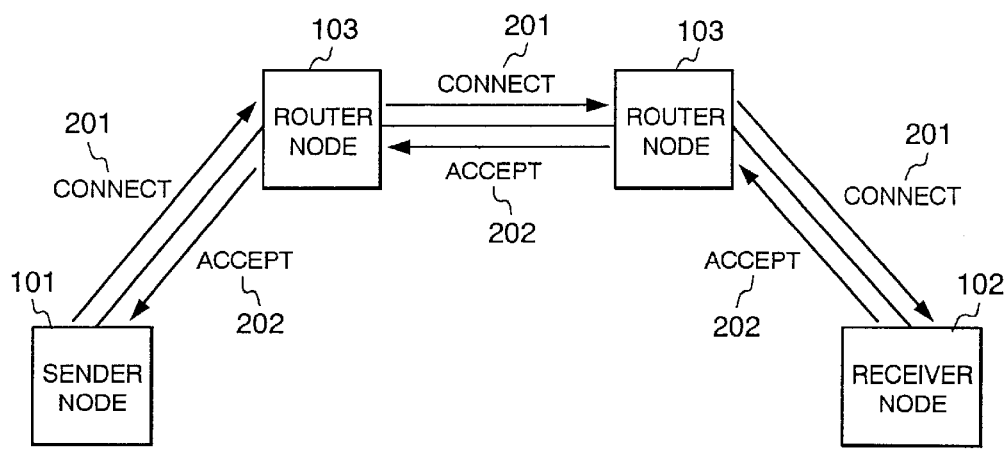
FIG. 2 is a flow chart of a control message when the resource reservation succeeds.

The flow of control data necessary to transfer continuous media data according to the data communication method of the present invention is shown in FIG. 2.

According to the data communication method of the present invention, before starting to transfer continuous media data to the receiver node (102), the sender node (101) sends the control message CONNECT (201) to the receiver node. The control message CONNECT requests establishment of a logical connection from the sender node to the receiver node. After establishment of the logical connection, it is guaranteed that a data buffer, CPU time, and bandwidth necessary to send, relay, and receive continuous media data along the connection are secured at each node on the connection.

The control message CONNECT is relayed by the router nodes (103) and reaches the receiver node. The sender node and router node for sending and relaying the control message CONNECT reserve the aforementioned miscellaneous resources immediately before sending and relaying the control message CONNECT to the next node. Details of this reservation method will be described later.

The receiver node receiving the control message CONNECT sends a control message ACCEPT (202) to the sender node so as to accept the logical connection from the sender node. Upon receipt of the control message ACCEPT, the sender node starts to transfer continuous media data.

As mentioned above, according to the data communication method of the present invention, it can be guaranteed that by interchanging the control message CONNECT and the control message ACCEPT before transferring continuous media data, a transfer delay of continuous media data due to deficiency of the bandwidth, deficiency of the processing capacity of the nodes (deficient CPU time), and deficiency of the data buffer will not occur.

Figure 3:
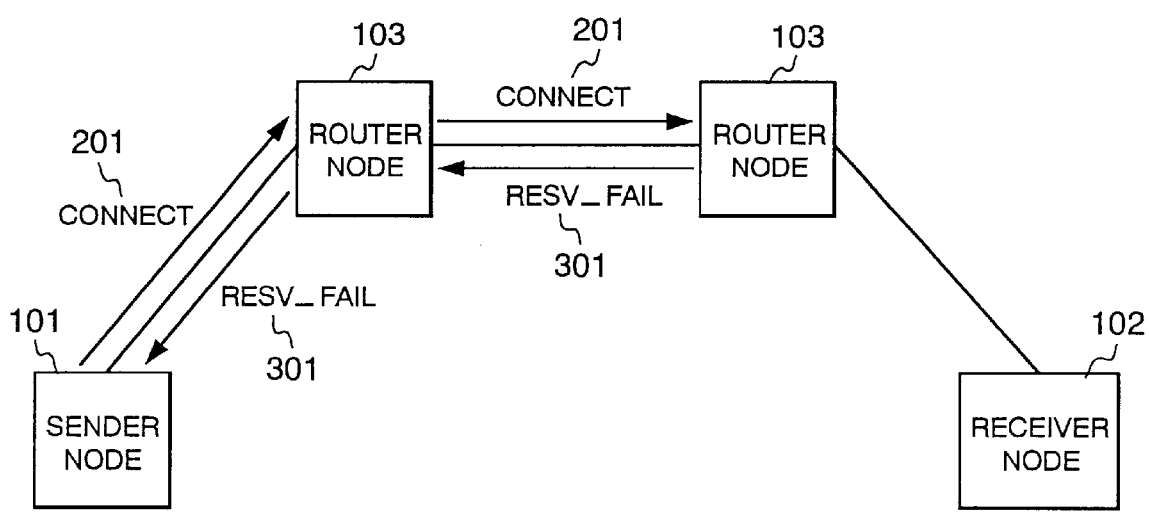
FIG. 3 is a flow chart of a control message when the resource reservation fails.

In the aforementioned example, it can be considered that the reservation of miscellaneous resources to be executed immediately before sending and relaying the control message CONNECT may fail. The flow of the control data in this case is shown in FIG. 3. The node failing in resource reservation sends a control message RESV_FAIL (301) to the sender node (101). Furthermore, each node sending and relaying the message RESV_FAIL releases the miscellaneous resources secured immediately before sending and relaying the control message CONNECT (201) immediately before sending and relaying the message RESV_FAIL. By doing this, the sender node can know that it is impossible to reserve miscellaneous resources necessary to transfer continuous media data. A resource uselessly reserved on each node also can be released.

Figure 4:
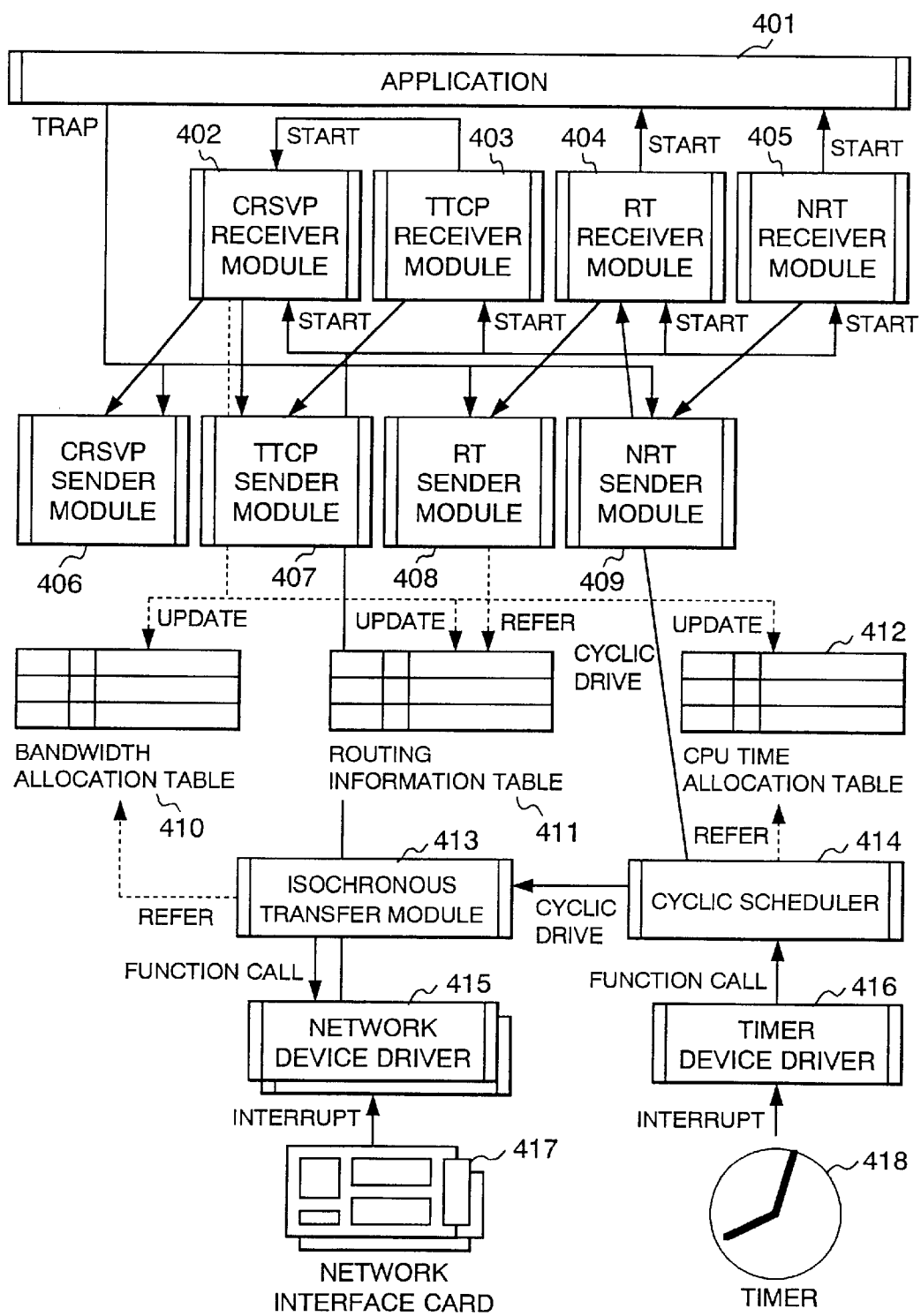
FIG. 4 is a structural diagram of node software modules and data.

The constitution of software modules and data structure to be provided in each node (the sender node, receiver node, and router nodes) so as to realize the data communication method of the present invention is shown in FIG. 4.

In each node, there is an application (401) for setting various parameters to be used to send and receive continuous media data and allocate resources.

Furthermore, each node is provided with a network device driver for controlling a network interface card (417) and a timer device driver for controlling a timer device (418).

Furthermore, in each node, there are a CRSVP receiver module (402), a CRSVP sender module (406), a TTCP receiver module (403), a TTCP sender module (407), an RT receiver module (404), an RT sender module (408), an NRT receiver module (405), and an NRT sender module (409). These are protocol stacks necessary to send and receive the control message and continuous media data by the network.

The CRSVP receiver module (402) and the CRSVP sender module (406) are protocol stacks for sending and receiving the control message CONNECT, control message ACCEPT, and control message RESV_FAIL shown in FIGS. 2 and 3. The CRSVP receiver module is started by the network device driver (415) when it receives the aforementioned control messages. Upon receipt of these messages, the CRSVP receiver module reserves miscellaneous resources such as the bandwidth and CPU time and constructs routing information of continuous media data as required. The CRSVP receiver module reflects the results to a bandwidth allocation table (410), a CPU time allocation table (412), and an routing information table (411) of continuous media data.

When the bandwidth is to be reserved by the network with shared media, the network with shared media calls the TTCP sender module so as to send the control message requesting reservation of the bandwidth to the bandwidth management server. When it is necessary to relay and send the control message to another node after completion of reservation of miscellaneous resources, the network with shared media calls the CRSVP sender module.

The TTCP receiver module (403) and the TTCP sender module (407) are protocol stacks necessary to send and receive the control message to and from the bandwidth management server so as to reserve the bandwidth by the network with shared media. As mentioned above, when reservation of the bandwidth is necessary, the TTCP sender module is called by the TTCP receiver module. When the control message requesting the bandwidth is sent to the bandwidth management server, the bandwidth management server sends back the control message including the request result to the self node. The TTCP receiver module receives the control message via the network device driver (415). Furthermore, the TTCP receiver module starts the CRSVP receiver module and notifies the result to it.

The RT receiver module (404) and the RT sender module (408) are protocol stacks necessary to receive and send continuous media data. The RT receiver module is cyclically driven by a cyclic scheduler (414). The RT receiver module searches for the continuous media data received by the network device driver (415). When the continuous media data is one for the self node, the RT receiver module notifies the arrival of the continuous media data to the application (401). When it is necessary to relay the continuous media data to another node, the RT receiver module calls the RT sender module.

The RT sender module refers to the routing information table (411) of continuous media data and relays it. The RT sender module also receives a continuous media data transfer request from the application. In this case, the RT sender module is called by a trap from the application.

The NRT receiver module (405) and the NRT sender module (409) are protocol stacks necessary to receive and send normal data. These modules perform the quite same operation as that of the existing UDP/IP protocol stack ('INTER NETWORKING WITH TCP/IP Volume 1', DOUGLAS E. COMER, PRENTICE HALL, pp 89–121, pp 159–169, 1991). Hereinafter, in this embodiment, it is assumed that the receiver module and sender module of the UDP/IP protocol stack are used for the NRT receiver module and sender module.

Furthermore, there is a sending control module (isocronous transfer module) (413) in each node. There is a sending control module (413) for each network interface card. The sending control module once queues data requested to send to the network from the CRSVP sender module (406), the TTCP sender module (407), the RT sender module (408), and the NRT sender module (409) and performs a process of data transfer (issues a data transfer request to the network device driver (415)) using the allocated bandwidth just enough according to the bandwidth allocation table (410). The existence of this module permits realization of data transfer to a network strictly following the bandwidth allocation table constructed by the CRSVP receiver module.

There is a cyclic scheduler (414) in each node. The cyclic scheduler is started by the timer device driver (416) and performs a process of driving the sending control module and RT sender module strictly in a fixed cycle and a process of making the moving hours of these modules strictly agree with the contents of the CPU time allocation table (412) constructed by the CRSVP receiver module. The existence of this module permits realization of scheduling strictly following the CPU time allocation table constructed by the CRSVP receiver module. In this embodiment, it is assumed that the isochronous scheduler ('WORLDWIDE COMPUTING AND ITS APPLICATIONS '97', Takashi Masuda et al., Springer, pp 334–349, 1997) is used as a cyclic scheduler.

Figure 5:
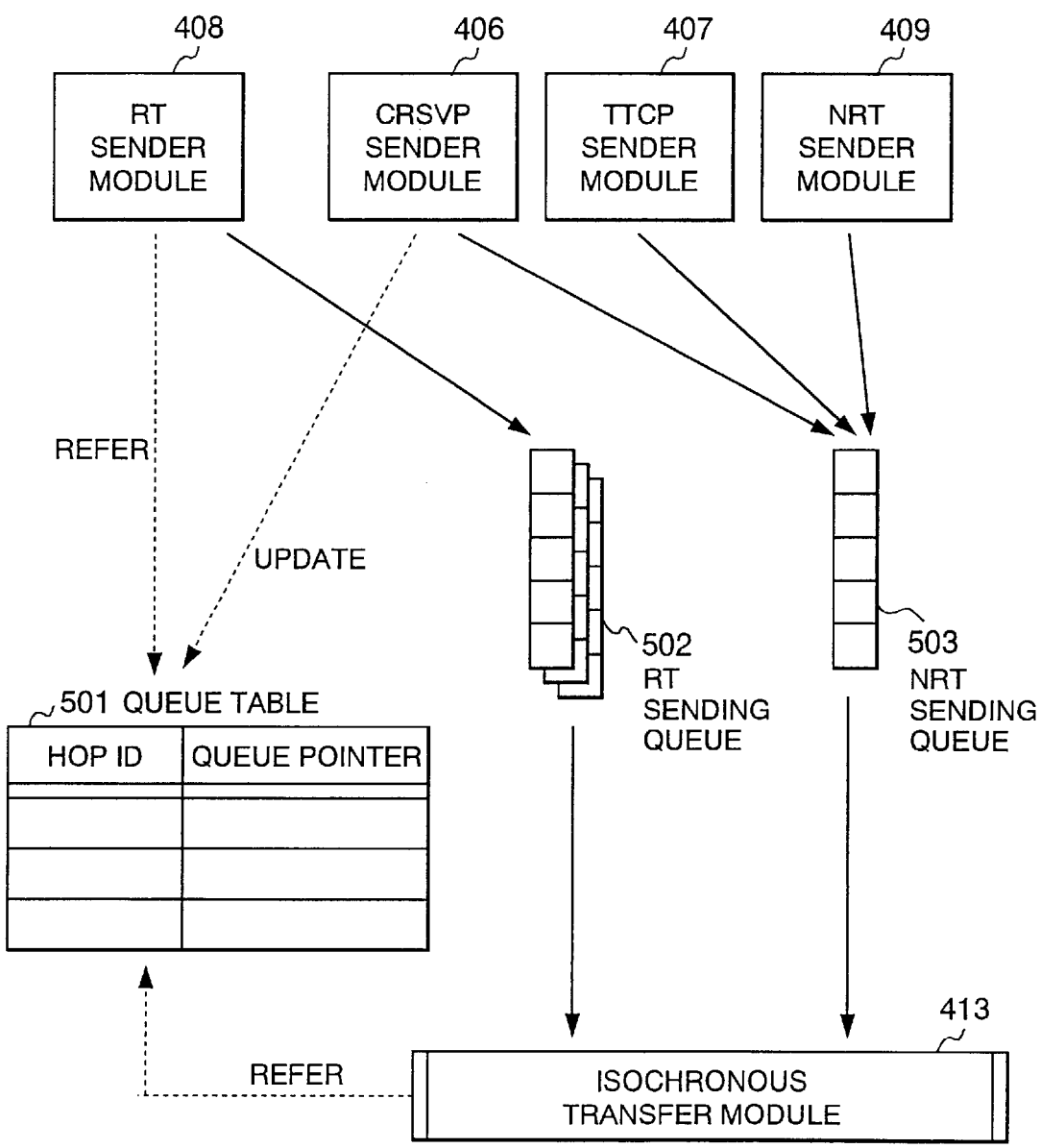
FIG. 5 is a structural diagram of data used at packet sending time.

The data structure necessary to transfer a sent packet to the sending control module (413) by each sender module is shown in FIG. 5.

When the RT sender module (408) requests sending of a packet to the sending control module, it enqueues the packet requested to send to the RT sending queue (502). There is an RT sending queue for each logical connection. The correspondence of a hop ID (it exists for each logical connection) and a queue pointer is managed by a queue table (501).

On the other hand, the CRSVP sender module (406), the TTCP sender module (407), and the NRT sender module (409) enqueue the packet requested to send to the sending control module. There is only one NRT sending queue for each sending control module.

The data structure necessary to transfer the received packet to each receiver module by the network device driver (415) is shown in FIG. 6.

Upon receipt of a packet, the network device driver discriminates the receiver module to receive the packet from the content of the packet header. When transferring the received packet to each of the CRSVP receiver module (402), the TTCP receiver module (403), the RT receiver module (404), and the NRT receiver module (405), the network device driver enqueues it to a CRSVP receiving queue (601), a TTCP receiving queue (602), an RT receiving queue (603), and an NRT receiving queue (604).

The outline of operations of the main modules among the modules shown in FIG. 4 will be described hereunder.

Firstly, the outline of the operation of the CRSVP receiver module (402) will be described by referring to FIGS. 7 to 15.

The packet format of a control message sent and received by the CRSVP receiver module and the CRSVP sender module (406) is shown in FIG. 7. The CRSVP packet comprises an IP header (701), a sender node IP address (702), a sender node port No. (703), a receiver node IP address (704), a receiver node port No. (705), a command (706), and a required transfer rate (707).

The IP header (701) includes the quite same information as that of the IP head of an existing IP packet.

The sender node IP address (702), the sender node port No. (703), the receiver node IP address (704), and the receiver node port No. (705) respectively store the IP addresses of the sender and receiver nodes of the logical connection corresponding to this packet and the port Nos. used by the sender and receiver nodes when continuous media data is transferred on the logical connection.

In the command (706), the packet type (one of CONNECT, ACCEPT, and RESV_FAIL) is stored.

The required transfer rate (707) is used only when the packet type is CONNECT and stores the required transfer rate of continuous media data. It is assumed that the packet length per each packet and the number of transfer packets per unit time are stored in the required transfer rate.

Figure 8:
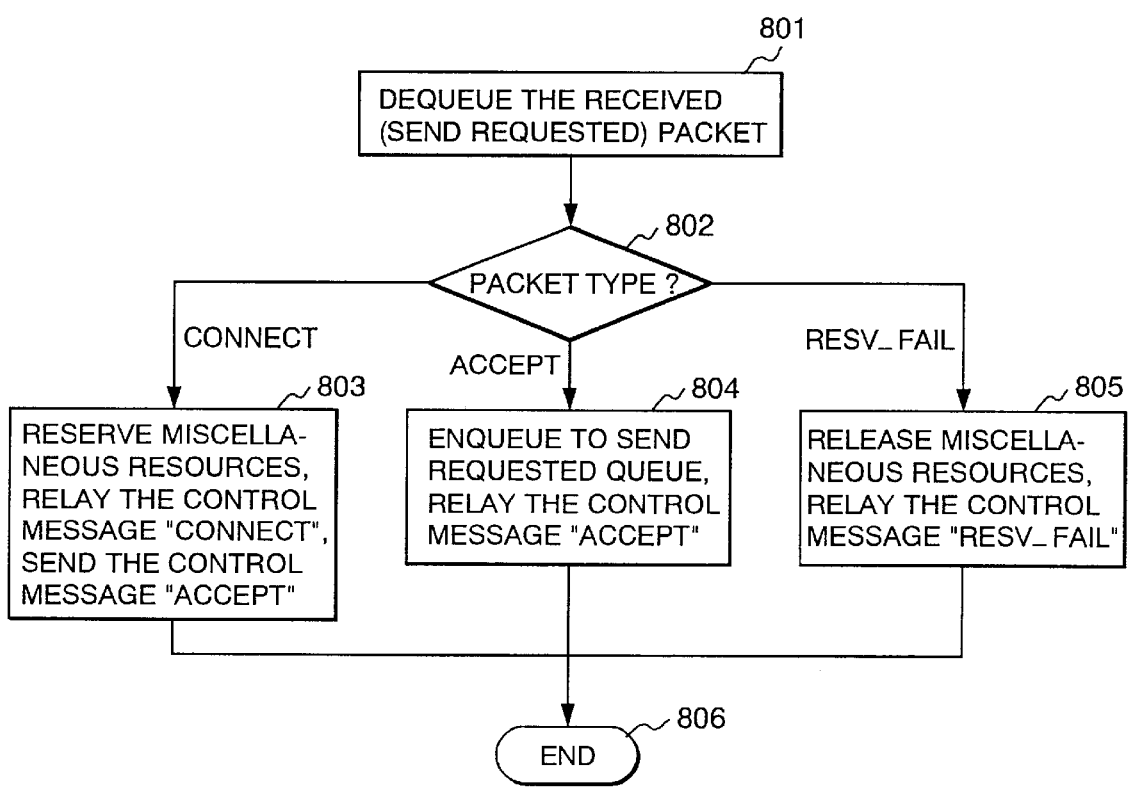
FIG. 8 is a flow chart of a CRSVP receiver module.

The processing flow of the CRSVP receiver module (402) is shown in FIG. 8. The CRSVP receiver module is started by reception notification of the CRSVP packet from the network driver (415) or issue of a CRSVP packet sending request from the application. The received packet and the packet requested to send are queued in the CRSVP receiving queue (601).

At Step 801, the CRSVP receiver module dequeues the queued packet.

At Step 802, the CRSVP receiver module searches for the packet type field (706) of the dequeued packet. When the packet type field is CONNECT, the program jumps to Step 803, and when it is ACCEPT, the program jumps to Step 804, and when it is RESV_FAIL, the program jumps to Step 805.

At Step 803, the CRSVP receiver module reserves miscellaneous resources and calls the function of the CRSVP sender module (406) so as to send and relay the control message CONNECT or relay the control message ACCEPT. Details of this process will be described later by referring to FIG. 9.

At Step 804, the CRSVP receiver module calls the CRSVP sender module so as to relay the control message ACCEPT.

At Step 805, the CRSVP receiver module releases miscellaneous resources and calls the CRSVP sender module so as to relay the control message RESV_FAIL (if necessary). The release process of miscellaneous resources can be realized by performing the reverse process of the reservation process of miscellaneous resources at Step 803. Therefore, the detailed processing flow will be omitted in this specification.

The detailed processing flow of Step 803 is shown in FIG. 9.

At Step 901, it is decided whether the self node is a receiver node or a node other than it. This decision can be realized depending on whether the destination IP address of the IP header (701) of the packet dequeued at Step 801 agrees with the IP address (703) of the receiver node or not. When it is a receiver node (when the aforementioned two addresses agree with each other), the program jumps to Step 910 and when it is not, the program jumps to Step 902.

At Step 902, the hop ID corresponding to the logical connection constructed by the control message CONNECT is obtained. This hop ID is decided by communication with the next hop so that it will be unique at the next hop. This decision algorithm is the same as the decision algorithm of the hop ID in ST-II, so that it will be omitted. By this communication, at the next hop, the correspondence of the IP address and port No. of the sender node belonging to the logical connection to the hop ID is registered in a hop ID registration table (1406). Details of the data structure of this table will be described later.

At Step 903, the CPU time necessary to send and relay continuous media data is reserved. Details of this reservation method will be described later by referring to FIGS. 10 and 11.

At Step 904, it is discriminated whether the network between the self node and the next hop is a network with unshared media or a network with shared media. This decision can be realized by performing the IP routing process by referring to the IP header (701) of the packet dequeued at Step 801 and deciding the network interface card (417) of sending destination. When the corresponding network is a network with unshared media, the program jumps to Step 905 and when the corresponding network is a network with shared media, the program jumps to Step 906.

At Step 905, the bandwidth necessary to send and relay continuous media data is secured. This security is executed by registering a pair of the hop ID secured at Step 902 and the required transfer rate field (907) of the packet dequeued at Step 801 in a predetermined table. When the total of registered required transfer rates is more than the transfer capacity of the network, the reservation of bandwidth at this step is error-returned.

At Step 906, communication is made with the bandwidth management server (104) and reservation of the bandwidth of the network with shared media is requested. Details of this step will be described later by referring to FIGS. 12 and 13.

At Step 907, the routing information necessary to send and relay continuous media data is constructed. Details of this step will be described later by referring to FIGS. 14 and 15.

At Step 908, the data buffer necessary to send and relay continuous media data is secured. Since this step is the same as the step of securing the data buffer in ST-II, details thereof will be omitted.

At Step 909, the CRSVP sender module (406) is called so as to send and relay the message CONNECT to the next hop. Then, the program jumps to Step 914 and ends normally.

At Step 910, the CPU time necessary to receive continuous media data is reserved. Details of this reservation method will be described later by referring to FIGS. 10 and 11.

At Step 911, the routing information necessary to receive continuous media data is constructed. Details of this step will be described later by referring to FIGS. 14 and 15.

At Step 912, the data buffer necessary to receive continuous media data is reserved. Since this step is the same as the step of securing the data buffer in ST-II, details thereof will be omitted.

At Step 913, the CRSVP sender module (406) is called so as to send the message ACCEPT to the sender node. The packet for storing the message ACCEPT generated at this step is the same as the packet dequeued at Step 801 except the IP header (701) and the packet type (706) field. The IP address of the self node is stored in the IP address of the sending source of the IP header and the IP address stored in the IP address (702) of the sender node is stored in the destination IP address. ACCEPT is stored in the packet type (706) field.

Although not shown in the drawing, at Steps 903, 905, 906, 908, 910, and 912, the reservation of miscellaneous resources may fail. If this occurs, to release the resources secured at these steps and then send the control message RESV_FAIL, the CRSVP sender module is called. The packet for storing the control message RESV_FAIL generated at this step is the same as the packet generated at Step 913 except that RESV_FAIL is stored in the packet type (706) field.

The data structure of tables necessary to realize reservation of the CPU time at Steps 903 and 910 is shown in FIG. 10.

The CPU time reservation process is performed using a CPU time allocation table (1001), an allowable CPU time upper limit table (1006), and a necessary CPU time/unit transaction table (1009). The CPU time allocation table is dynamically updated at Steps 903 and 910. On the other hand, the allowable CPU time upper limit table and the necessary CPU time/unit transaction table are preset by the application (401). An interface used for this setting will be described later.

The CPU time allocation table comprises a table (1002) for managing CPU time allocation of the sending control module (413) (hereinafter referred to as the sending control module CPU time allocation table) and a table (1003) for managing CPU time allocation of the RT receiver module (hereinafter referred to as the RT receiver module CPU time allocation table). In each of the tables, a pair of a hop ID (1004) and a utilization (1005) of the CPU time reserved so as to send or receive continuous media data flowing on the logical connection corresponding to the hop ID is stored.

In the allowable CPU time upper limit table, there are fields (1007, 1008) for storing the maximum CPU time utilization which can be used by each of the sending control module and RT receiver module. It is necessary that the total of the utilizations stored in the sending control module CPU time allocation table and the RT receiver module CPU time allocation table are smaller than the utilizations stored in the fields 1007 and 1008.

The necessary CPU time/unit transaction table is a table for storing the unit price of the CPU time utilization required to send and receive one packet by the corresponding node. This table comprises a table (1010) storing the unit price of the receiving process and a table (1011) storing the unit price of the sending process. In each table, the processing unit price (1012) for each byte of the process depending on the packet length of the sending and receiving process and the processing unit price (1013) of the process independent on the packet length are stored.

Figure 11:
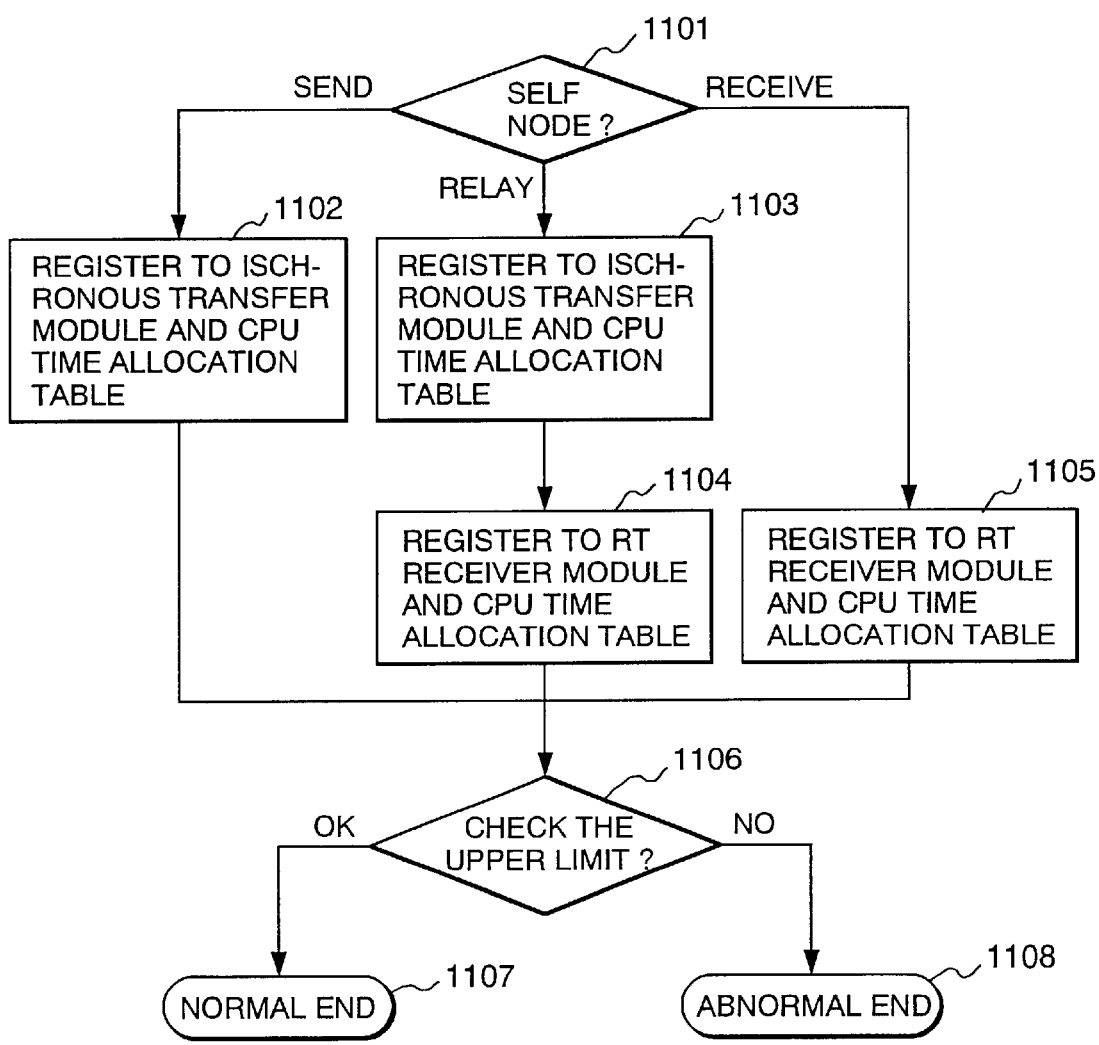
FIG. 11 is a detailed flow chart of Steps 903 and 910.

Details of the reservation process of the CPU time executed at Steps 903 and 910 are shown in FIG. 11.

At Step 1101, it is decided which one is the self node, the sender node, relay node, or receiver node. This decision can be realized by checking whether the sending source address of the IP header (701) of the packet dequeued at Step 801 agrees with the IP address (702) of the sender node and the destination address of the IP header agrees with the IP address (704) of the receiver node. When the self node is a sender node, the program jumps to Step 1102, and when it is a relay node, the program jumps to Step 1103, and when it is a receiver node, the program jumps to Step 1105.

At Step 1102, the registration process into the sending control module CPU time allocation table (802) is performed. As a hop ID to be registered, the hop ID secured at Step 902 is specified. For the CPU time utilization, a value calculated by the following procedure is stored.

It is assumed that the packet length L and the number of packets N per unit time are stored in the required transfer rate of the packet dequeued at Step 801. It is also assumed that Csd is stored in the packet length dependent field of the table 1011 and Csi is stored in the packet length independent field. In this case, the CPU time utilization to be registered is Csi+Csd×N.

Step 1103 is exactly the same as Step 1102.

At Step 1104, the registration process into the RT receiver module CPU time allocation table (1003) is performed. As a hop ID to be registered, the hop ID corresponding to the IP address (702) of the sender node of the packet dequeued at Step 801 and the sender node port number (703) is specified. This correspondence can be obtained from the hop ID registration table (1406) which will be described later. The CPU time utilization to be registered is calculated as specified below.

It is assumed that the packet length L and the number of packets N per unit time are stored in the required transfer rate of the packet dequeued at Step 801. It is also assumed that Csd is stored in the packet length dependent field of the table 1010 and Csi is stored in the packet length independent field. In this case, the CPU time utilization to be registered is Csi+Csd×N.

Step 1105 is exactly the same as Step 1104.

At Step 1106, it is checked whether the total of the CPU time utilizations registered in the sending control module CPU time allocation table (1002) and the total of the CPU time utilizations registered in the RT receiver module CPU time allocation table (1003) are more than the upper limits registered in the allowable bandwidth upper limit table (1006). When they are not more than the upper limits, the program jumps to Step 1107 and ends normally. When they are more than the upper limits, the program jumps to Step 1108 and ends abnormally. After abnormal end, the hop ID secured at Step 902 and the reservation of CPU time secured at Step 903 are released and the CRSVP sender module is called so as to send the control message RESV_FAIL to the sender node.

The data structure necessary to realize reservation of the bandwidth of the network with shared media at Step 906 is shown in FIG. 12.

The bandwidth management server comprises a bandwidth allocation table (1201) and an allowable bandwidth upper limit table (1207) of the bandwidth of the network. The bandwidth allocation table exists for each network interface card (417) connected to each node and stores the reservation condition of the bandwidth managed for each network interface. This table comprises a table (1202) for managing the reservation condition of the bandwidth used by the RT sender and receiver modules (408, 404) (hereinafter referred to as the RT bandwidth allocation table) and a table (1205) for managing the reservation condition of the bandwidth used by the NRT sender and receiver modules (409, 405) (hereinafter referred to as the NRT bandwidth allocation table). Furthermore, in the RT bandwidth allocation table, there are a field (1203) for storing a hop ID and a field (1204) for storing the bandwidth used to transfer continuous media data on the logical connection corresponding to the corresponding hop ID. Therefore, the bandwidth reservation condition for each logical connection can be discriminated.

The allowable bandwidth upper limit table (1207) stores a pair of a network interface name (1208) and a bandwidth upper limit (1209) on the corresponding network interface. It is necessary that the total of used bandwidths registered in the bandwidth allocation table is not more than the bandwidth upper limit in the table.

Figure 13:
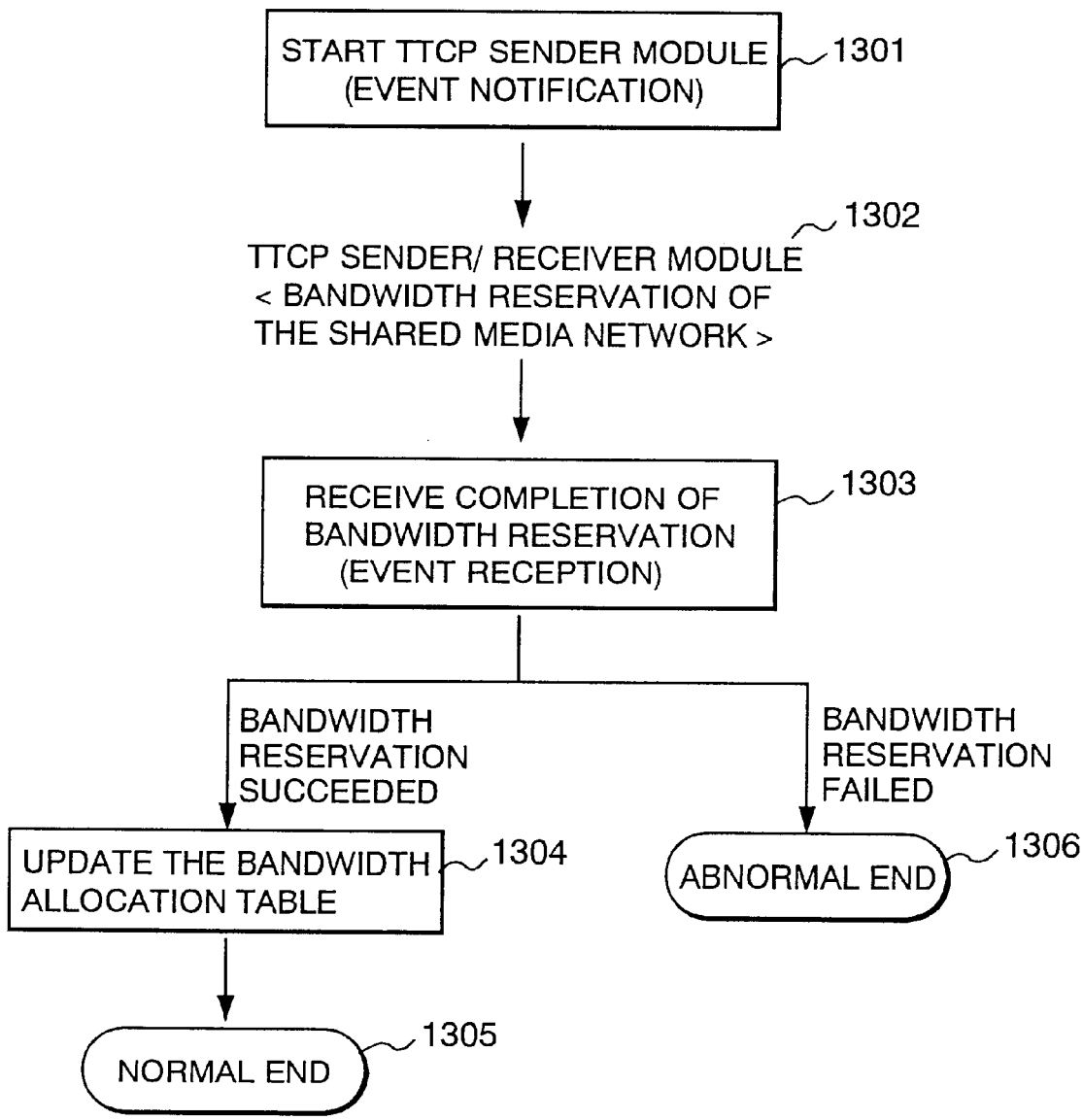
FIG. 13 is a detailed flow chart of Step 906.

Details of the processing flow of bandwidth reservation of the network with shared media executed at Step 906 are shown in FIG. 13.

At Step 1301, the TTCP sender module (407) is started so as to send a control message requesting bandwidth reservation to the bandwidth management server (104). The required bandwidth calculated from the information included in the required transfer rate field (707) of the packet dequeued at Step 801 is also informed to the TTCP sender module.

At Step 1302, the TTCP sender module and the TTCP receiver module (403) send or receive the control message to or from the bandwidth management server. Details of this process are the same as those of the sending and receiving process of control message of the TTCP/ITM.

At Step 1303, the processor waits for completion of the aforementioned process. The aforementioned queuing of the CRSVP receiver module (402) is released by the TTCP receiver module started when the control message for bandwidth reservation is received. In this case, the result of the bandwidth reservation required by the CRSVP receiver module is also notified. When the success notification of bandwidth reservation reaches, the program jumps to Step 1304 and when the failure notification reaches, the program jumps to Step 1306.

At Step 1304, the bandwidth allocation table (1201) is updated. Concretely, the hop ID obtained at Step 902 is stored in the hop ID field (1203) of the RT bandwidth allocation table (1202) and the bandwidth whose reservation succeeds by the aforementioned step is stored in the used bandwidth field (1204). The program further jumps to Step 1305 and ends normally.

By this step, the total of used bandwidths registered in the bandwidth allocation table will not exceed the bandwidth upper limit (1209) stored in the allowable bandwidth upper limit table (1207) (the bandwidth management server allocates the bandwidths so that the total thereof will not exceed the upper limit). The used bandwidth (1206) field of the NRT bandwidth allocation table (1205) is updated by the TTCP receiver module at Step 1302.

At Step 1306, the program ends abnormally. Hereafter, the hop ID secured at Step 902 and the reservation of CPU time secured at Step 903 are released and the CRSVP sender module (406) is called so as to send the control message RESV_FAIL to the sender node.

The data structure necessary to manage routing information is shown in FIG. 14. Routing information is managed by use of the routing information table (1401) and the hop ID registration table (1406).

The routing information table comprises fields of received hop ID (1402), interface name (1403), sent hop ID (1404), and LAN address (1405).

The table indicates that a packet storing the received hop ID (1402) in the header and storing arrived continuous media data stores values specified by the sent hop ID (1404) and the LAN address (1405) in the header and then is to be sent from the network interface specified by the interface name (1403).

The hop ID registration table comprises fields of hop ID (1407), sender node IP address (1408), and sender node port No. (1409). The table indicates that the hop ID (1407) corresponds to the logical connection uniquely decided by a pair of the sender node IP address (1408) and the sender node port No. (1409). As mentioned above, the registration entry of this ID table is generated when the previous hop executes Step 902 and obtains the hop ID.

Figure 15:
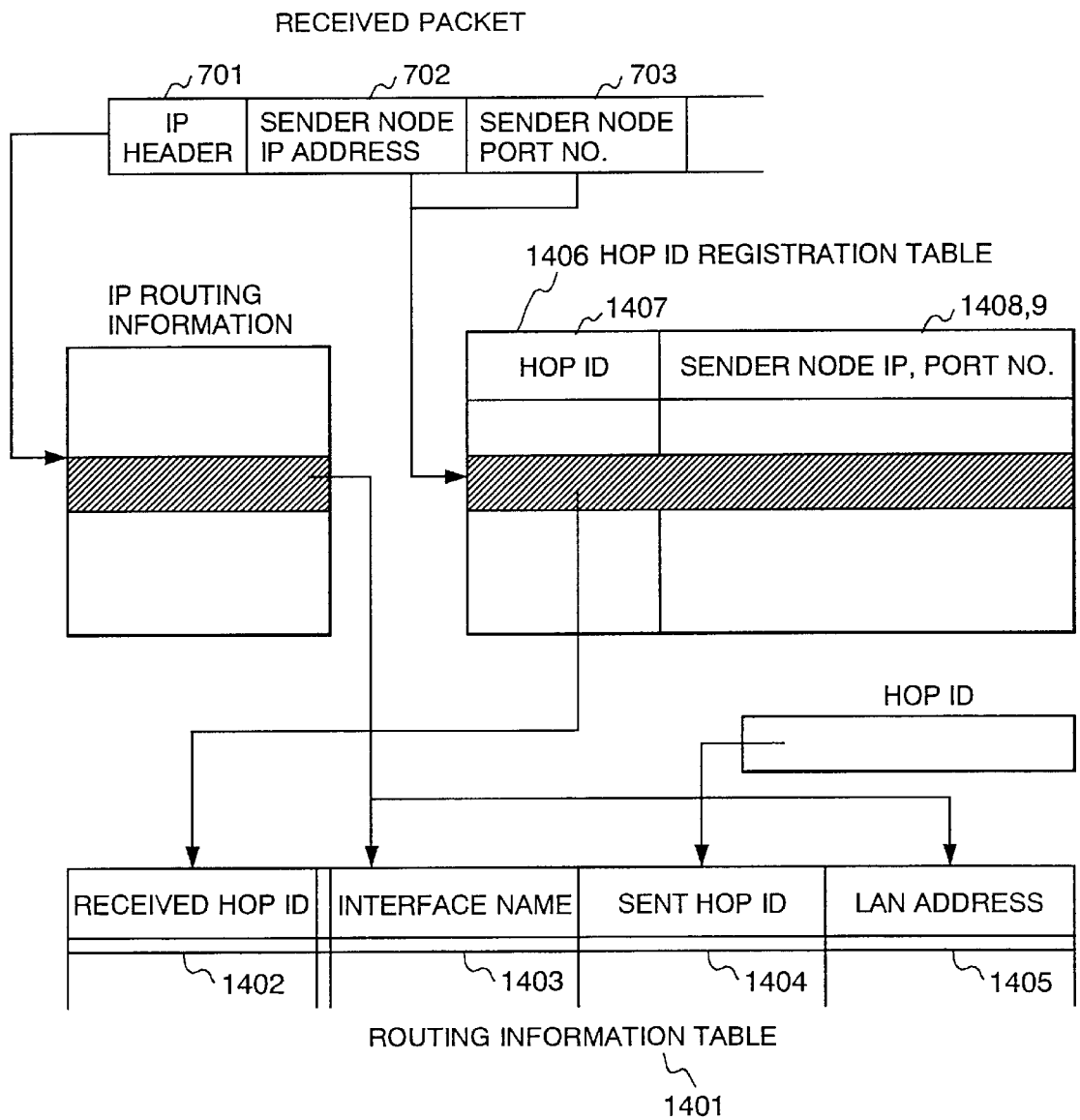
FIG. 15 is a detailed flow chart of Steps 907 and 911.

The construction method of the routing information table at Steps 907 and 911 will be described in detail by referring to FIG. 15.

In the received hop ID (1402) field, the value in the hop ID (1407) field (an entry of the hop ID registration table) with which the sender node IP address (702) and sender node port No. (703) of the packet received at Step 801 agree is stored.

In the interface name (1403) and LAN address (1405) fields, the interface name connected to the next hop and the LAN address of the next hop which can be obtained from the IP header (701) of the packet received at Step 801 and the IP routing information are stored. When the self node is a receiver node and there is no next hop, LOCAL is stored in the interface name field.

In the sent hop ID (1404) field, the hop ID obtained at Step 902 is stored. However, when the self node is a receiver node, nothing is stored.

Figure 16:
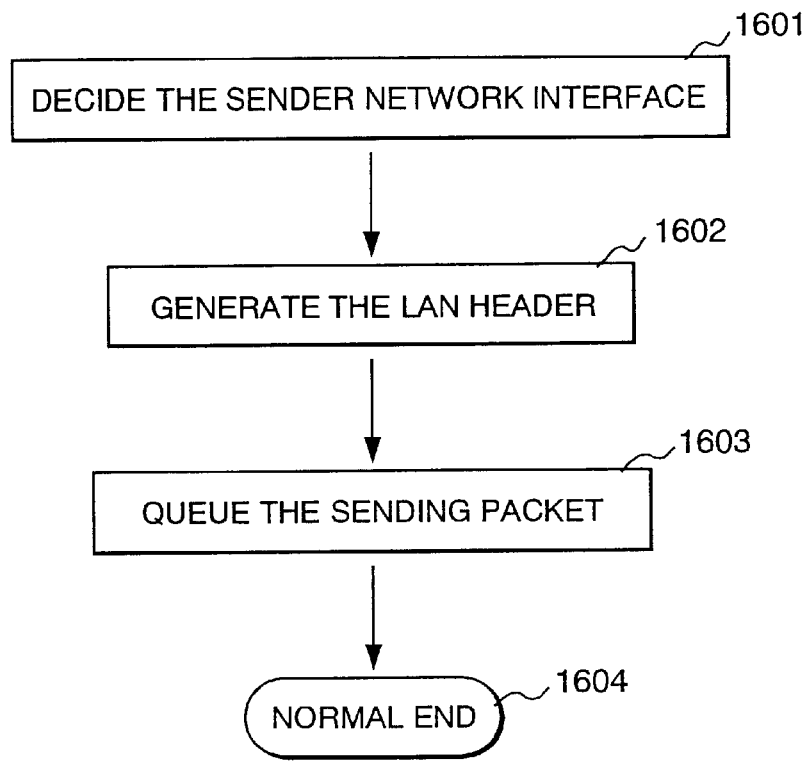
FIG. 16 is a flow chart of a CRSVP sender module.

The outline of the operation of the CRSVP sender module (406) is shown in FIG. 16.

At Step 1601, the sender network interface is decided. The decision is realized by performing the same process as the IP routing process from the IP header (701) of the CRSVP packet transferred from the CRSVP receiver module (402) and the IP routing information.

At Step 1602, the LAN header including the LAN address of the next hop is generated. This process can be realized by the same algorithm as the Ethernet header creation algorithm when the IP protocol stack sends to Ethernet.

At Step 1603, the packet including the LAN header generated at Step 1602 is enqueued to the NRT sending queue (503). The enqueued packet is sent to the network later by the sending control module (413).

At Step 1604, the program ends normally.

The outline of the operation of the RT receiver module (404) will be described by referring to FIGS. 17 and 18.

Figure 17:
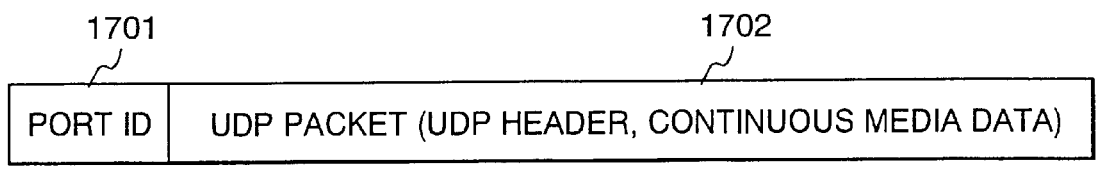
FIG. 17 is a format of an RT packet.

The format of a packet sent and received by the RT sender and receiver modules is shown in FIG. 17. The packet comprises a port ID (1701) and a UDP packet (1702) field. The packet header and continuous media data are included in the UDP packet field.

Figure 18:
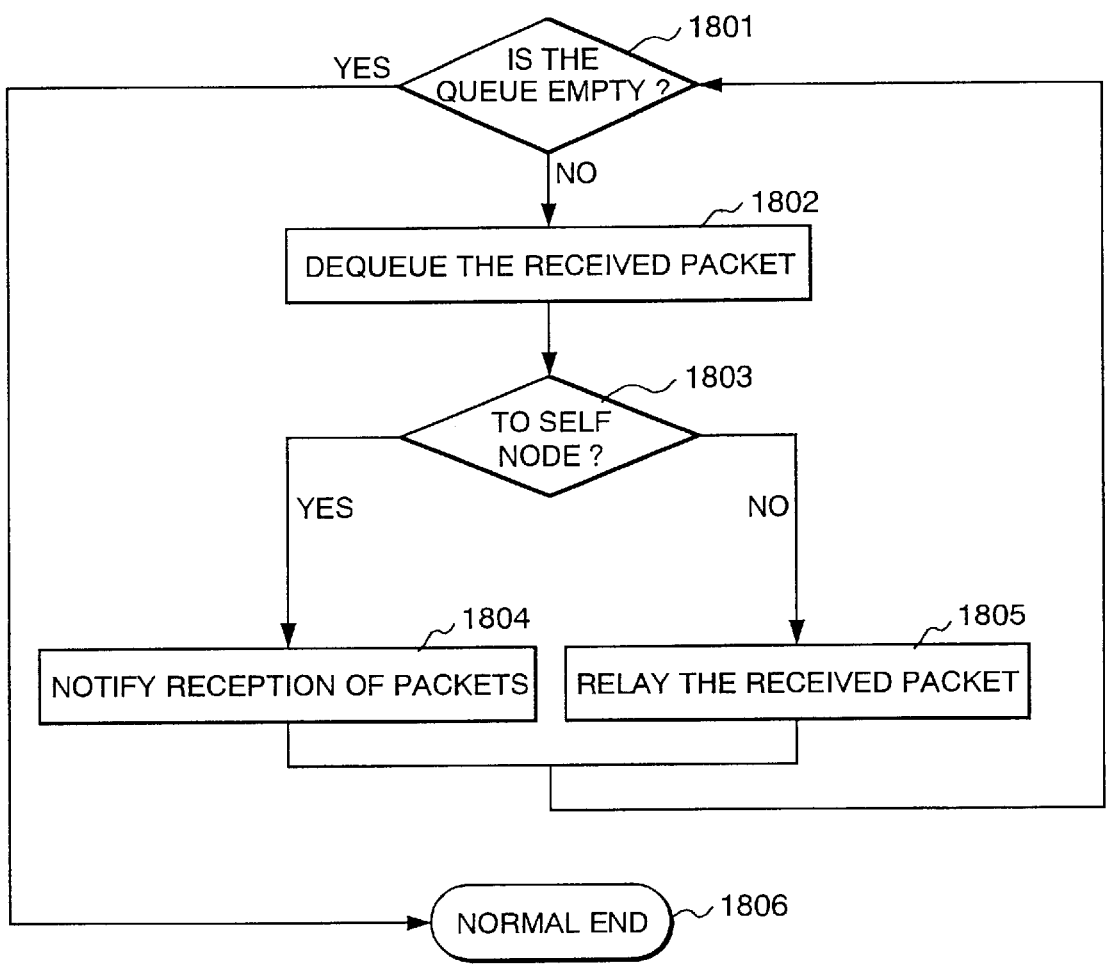
FIG. 18 is a flow chart of an RT receiver module.

The processing flow of the RT receiver module is shown in FIG. 18.

The RT receiver module is cyclic-driven by the cyclic scheduler (414). When the packet to be received by the RT receiver module reaches, the network device driver (415) enqueues the corresponding packet to the RT receiving queue (603). The RT receiver module checks at Step 1801 whether the RT receiving queue is empty. When it is empty, the program jumps to Step 1806 and ends normally and when it is not empty, the program jumps to Step 1802.

At Step 1802, the received packet is dequeued from the RT receiving queue.

At Step 1803, it is discriminated whether the received packet is a one to the self node or not. The discrimination is realized by searching for the entry of the routing information table (1401) corresponding to the port ID (1701) field of the received packet. When LOCAL is stored in the interface name (1403) field of the corresponding entry, it is a packet to the self node and when other than LOCAL is stored, it is found to be a packet to another node. When it is a packet to the self node, the program jumps to Step 1804 and when it is not, the program jumps to Step 1805. At Step 1804, the RT receiver module processes the UDP protocol and then notifies arrival of the UDP packet to the application (401). Then, the program jumps to Step 1801.

At Step 1805, the RT receiver module calls the RT sender module (408) so as to relay the received packet. Then, the program jumps to Step 1801.

Figure 19:
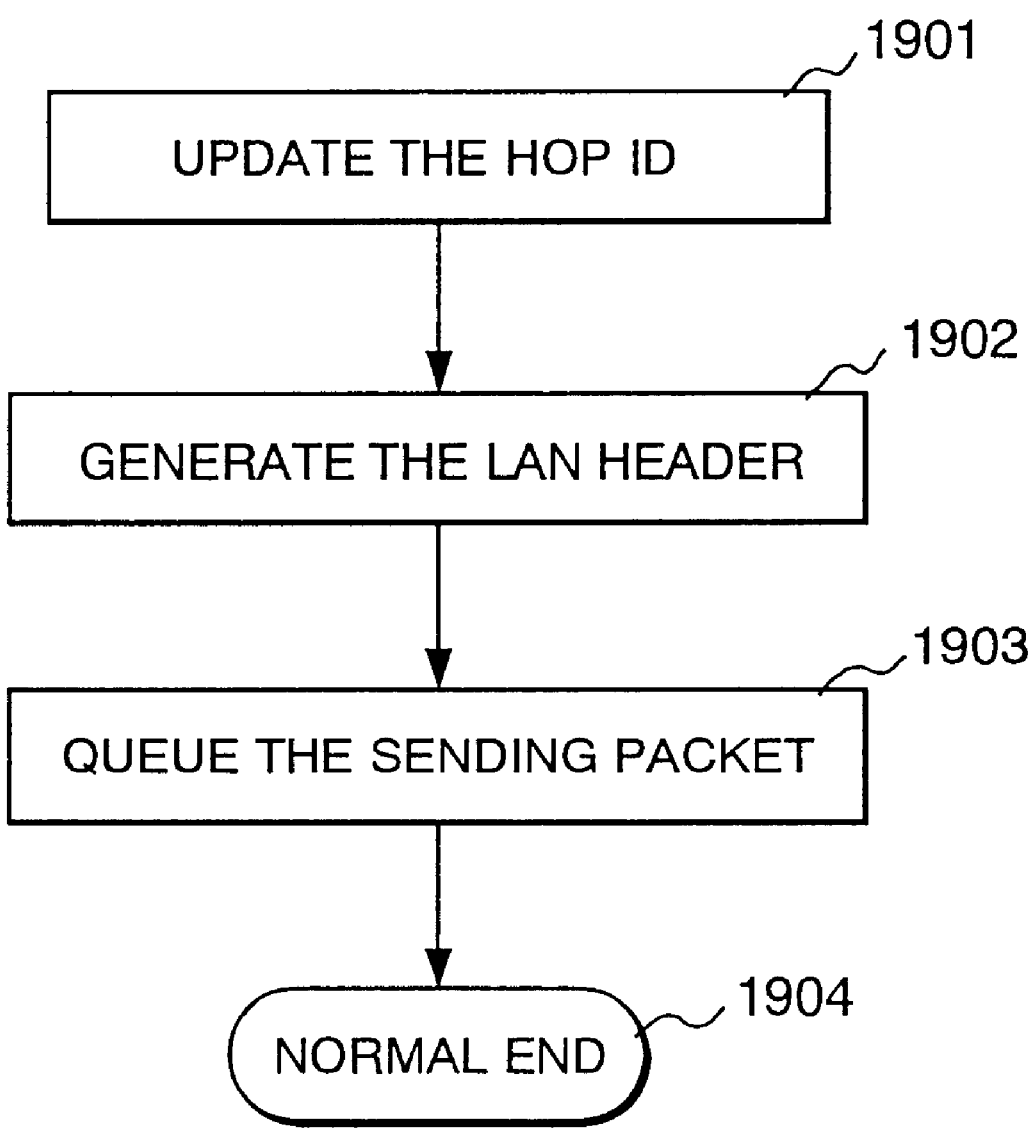
FIG. 19 is a flow chart of an RT sender module.

The outline of the operation of the RT sender module (408) will be described by referring to FIG. 19.

At Step 1901, the hop ID (1701) field of the packet whose relay is requested from the RT receiver module (404) is updated. The value of the hop ID field to be updated is obtained by referring to the hop ID (1404) field which is an entry of the routing information table (1401) corresponding to the value of the hop ID field of the corresponding packet.

At Step 1902, the LAN header to be included in the packet to be relayed is generated. The generation can be easily realized by use of the value of the LAN address (1905) field of the entry obtained above.

At Step 1903, the RT sending queue (502) of the corresponding packet is queued so as to send the packet data to be relayed to the network device driver (415). The queue address to be queued is decided by the following algorithm. Firstly, the queue table (501) corresponding to the interface name (1403) field of the entry obtained above is searched for. Among the obtained entries of the queue table, an entry that the value of the hop ID field agrees with the hop ID (1701) of the packet whose relay is requested is searched for. The value of the queue pointer field of the searched entry is the address to be obtained.

The outline of the operation of the sending control module (413) will be described by referring to FIG. 20. The sending control module exists for each network device driver (415) (that is, for each network interface card (417)).

Figure 20:
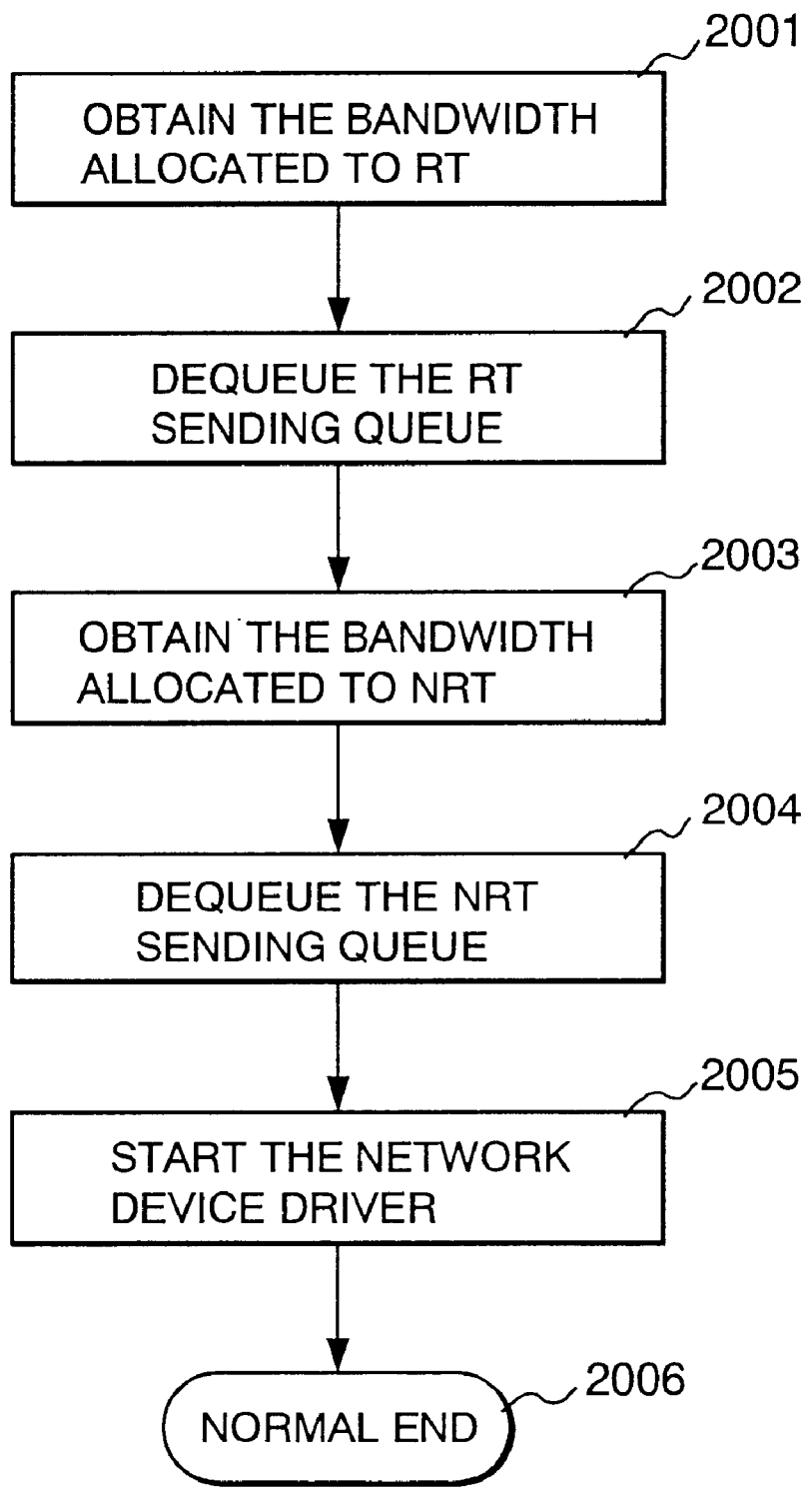
FIG. 20 is a flow chart of a sending control module.

The processing flow of the sending control module is shown in FIG. 20.

The sending control module is cyclically driven by the cyclic scheduler strictly at a fixed interval. The sending control module also keeps the total of sizes of packets sent in one cycle strictly constant. Therefore, it may be said that the sending control module realizes transfer to a network strictly following the used bandwidths registered in the bandwidth allocation table (1201).

At Step 2001, the sending control module reads the corresponding RT bandwidth allocation table (1202) and reads the hop ID (1203) and used bandwidth (1204) of the continuous media data to be sent by the self sending control module. At Step 2002, the sending control module calculates the total of sizes of packets to be sent in one cycle from the bandwidths read at Step 2001. The sending control module searches for the address of the RT sending queue (502) corresponding to the corresponding hop ID using the queue table (501) and then dequeues the packets from the queue top of the corresponding queue until the total of packet sizes reaches the aforementioned value. The sending control module repeats the processes at Steps 2001 and 2002 for the number of entries registered in the RT bandwidth allocation table.

At Step 2003, the sending control module reads the used bandwidth (1206) field of the corresponding NRT bandwidth allocation table (1205).

At Step 2004, the sending control module calculates the total of packet sizes to be sent in one cycle from the bandwidths read at Step 2003. The sending control module searches for the NRT sending queue (503) and dequeues the packets from the queue top until the total of packet sizes reaches the aforementioned value.

At Step 2005, the sending control module starts the network device driver so as to request sending of the packets dequeued at Steps 2002 and 2004 to the network device driver.

At Step 2006, the program ends normally.

The outline of the operation of the application (401) will be described by referring to FIG. 21.

The application requests establishment of the logical connection prior to transfer of continuous media data, sends and receives continuous media data, and sets various parameters to be used to process resources. The continuous media data sending and receiving process can be realized by use of the existing socket interface. The logical connection establishment request is executed using the following external interface.

kern_return_t establish_connection(portno_t send_portno, ipaddr_t, recv_IPaddr, portno_t recv_portno, size_t packet_size, int packet_num)

The aforementioned function requests establishment of the logical connection that the self node is a sender node and the node having the IP address specified by the argument recv_IPaddr is a receiver node. The function also declares that continuous media data flowing on the logical connection is sent from the UDP port on the sender node specified by the argument send_portno and received by the UDP port on the receiver node specified by the argument recv_portno. The function also declares that the size of one packet of continuous media data to be sent and received is the size specified by the argument packet_size and data as many as the number specified by the argument packet_num per second is transferred.

When continuous media data is transferred between the UDP ports specified above after declaration of this function, the function guarantees that as long as the sender performs the sending process according to the transfer rate specified by the arguments packet_size and packet_num, the receiver also can receive data at the same transfer rate.

Figure 21:
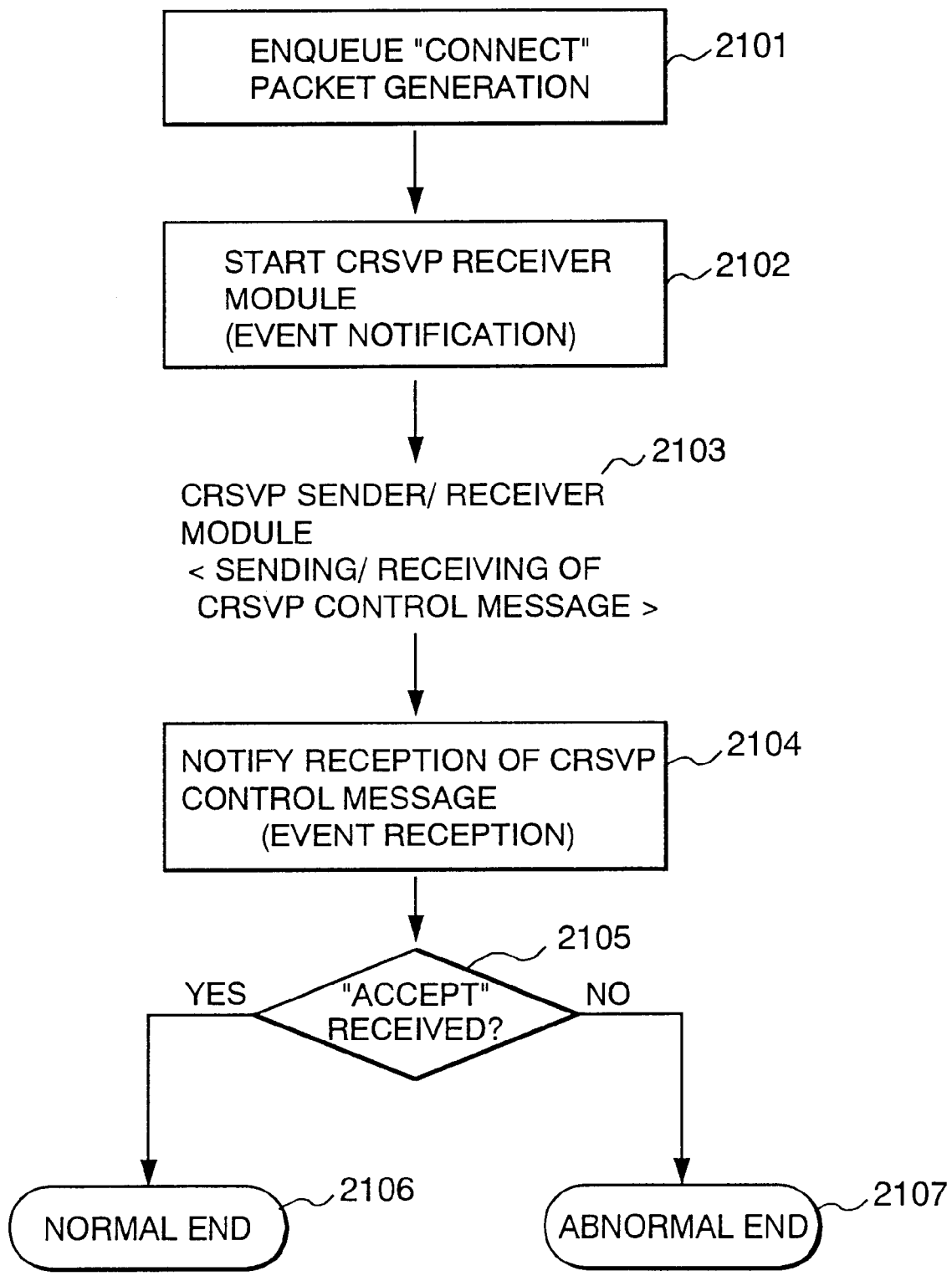
FIG. 21 is a flow chart of the function establish_ connection.

The processing flow of this function is shown in FIG. 21.

At Step 2101, a packet of the CONNECT type to be transferred to the CRSVP receiver module (402) is generated. In the sending source IP address of the IP header (701) of this packet and the sender node IP address (702), the IP address of the self node is stored and in the destination IP address of the IP header (701) and the receiver node IP address (704), the IP address specified by the argument recv_IPaddr is stored. In the sender node port No. (703) field, the port number specified by the argument send_portno is stored and in the receiver node port No. (705) field, the port number specified by the argument recv_portno is stored. Furthermore, in the required transfer rate field (707), a value specified by the arguments packet_size and packet_num is stored and in the packet type (706) field, CONNECT is stored. Furthermore, the generated packet is enqueued to the CRSVP receiving queue (601).

At Step 2102, the CRSVP receiver module is started.

At Step 2103, the CRSVP receiver module dequeues the aforementioned packet from the CRSVP receiving queue and then performs the aforementioned reservation process of miscellaneous resources and constructs routing information. Furthermore, to send the aforementioned packet to the receiver node, the CRSVP receiver module starts the CRSVP sender module. When the CONNECT type packet is sent to the receiver node, the ACCEPT type packet or RESV_FAIL type packet corresponding to the aforementioned packet is returned back to the self node. Upon receipt of these packets, the CRSVP receiver module notifies the arrival of the packets to the application.

At Step 2104, the application receives the aforementioned notification and starts operation.

At Step 2105, the application decides whether the received packets are of the ACCEPT type or the RESV_FAIL type. When they are of the ACCEPT type, the program jumps to Step 2106 and ends normally (KERN_SUCCESS is returned) and when they are of the RESV_FAIL type, the program jumps to Step 2107 and ends abnormally (error return).

The application sets the parameters to be registered in the allowable CPU time upper limit table (1006) which are used to reserve the CPU resources and each parameter of the necessary CPU time/unit transaction table. The following functions are used for this setting. The processing flow of these functions is self-evident, so that it will be omitted.

kern_return_t set_cpu_upperbound(module_name_t module_name, float utilization)

This function sets the upper limit of the utilization of CPU time of the module specified by the argument module_name to the value specified by the argument utilization. For module name, one of ITM indicating "sending control module" and RTRECVER indicating "RT receiver module" is specified. Even if CPU time reservation when the CPU utilization of each module is more than the value set above is issued from the CRSVP receiver module after declaration of this function, it will not be accepted.

kern_return_t set_cpu_transaction_time (transaction_type_t transaction_type, boolean length_dependent, float utilization)

This function declares that the CPU time required to process the type specified by the argument transaction_type is the value specified by the argument utilization. For the argument transaction_type, one of SEND indicating "sending" and RECV indicating "receiving" is specified. When TRUE is specified for the argument length_dependent, utilization indicates the CPU utilization for each byte required by the packet length dependent process among the sending and receiving processes. When FALSE is specified for the argument length_dependent, utilization indicates the CPU utilization required by the packet length independent process among the sending and receiving processes. For the CPU time reservation process to be performed by the CRSVP receiver module, the parameter set above is used.

In addition to the various modules explained above, the TTCP receiver module (403), the TTCP sender module (407), the NRT receiver module (404), the NRT sender module (408), the cyclic scheduler (414), the network device driver (415), and the timer device driver (416) are shown in FIG. 4. The operations of these modules are exactly the same as those of the existing modules, so that the explanation of their outlines will be omitted in this specification.

What is claimed is:

1. A method for sending a data packet from a first information processor to a second information processor via a relay device, comprising:

a step, performed by said first information processor, of sending a first control message containing IDs of said first and second information processors, a size of said data packet, and a transfer rate of said data packet to said relay device before said first information processor sends said data packet;

a step, performed by said relay device, of reserving sufficient CPU time to perform a relay process at said data packet size and said transfer rate indicated in said first control message, and sending said first control message to said second information processor;

a step, performed by said second information processor, of reserving sufficient CPU time to perform a receiving process at said data packet size and said transfer rate indicated in said first control message, and sending a second control message indicating that said first control message has been received to said first information processor; and a step of sending said data packet to said second information processor, by said first information processor, according to reception of said second control message.

2. A method for sending a data packet from a first information processor to a second information processor via a relay device according to claim 1, further comprising:

a step, performed by said second information processor, of sending a third control message indicating reservation failure to said relay device because said second information processor fails in reservation of sufficient CPU time to perform a receiving process at said data packet size and said transfer rate indicated in said first control message; and a step of releasing said reserved CPU time, by said relay device, according to reception of said third control message.

3. A method for sending a data packet from a first information processor to a second information processor via a relay device according to claim 1, wherein a CPU time to be reserved on the basis of a CPU time necessary for unit size of a data packet and a CPU time required by a process independent on a size of a data packet is calculated.

4. A method for sending a data packet to a second information processor by a first information processor via a network whose transmission path is shared by a plurality of information processors, comprising:

a step of sending, from said first information processor, a first control message containing IDs of said first and second information processors, a size of said data packet, and a transfer rate of said data packet, to a relay device in said network before said first information processor sends said data packet;

a step, performed by said relay device, of reserving sufficient CPU time to perform a relay process in said relay device, and necessary bandwidth of a transmission path in said network, by a bandwidth management server of said network, said CPU time and said necessary bandwidth being sufficient at said data packet size and said transfer rate indicated in said first control message, and sending said first control message to said second information processor;

a step, performed by said second information processor, of reserving sufficient CPU time to perform a receiving process at said data packet size and said transfer rate indicated in said first control message, and sending a second control message indicating that said first control message is received to said first information processor; and a step of sending said data packet to said second information processor, by said first information processor, according to reception of said second control message.

5. A method for sending a data packet from a first information processor to a second information processor via a network, comprising:

a step, performed by said first information processor, of sending a first control message containing IDs of said first and second information processors, a size of said data packet, and a transfer rate of said data packet to said network before said first information processor sends said data packet;

a step, performed by said second information processor, of reserving sufficient CPU time to perform a receiving process at said data packet size and said transfer rate indicated in said first control message, and sending a second control message indicating that said first control message is received to said first information processor; and a step of sending said data packet to said second information processor, by said first information processor, according to reception of said second control message.

* * * * *